(12) United States Patent
Volkerink et al.

(10) Patent No.: US 11,580,348 B2
(45) Date of Patent: Feb. 14, 2023

(54) TRANSIENT INFRASTRUCTURE FOR UBIQUITOUS NETWORK COMMUNICATIONS APPLICATIONS

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 16/822,932

(22) Filed: Mar. 18, 2020

(65) Prior Publication Data

US 2020/0226442 A1 Jul. 16, 2020

Related U.S. Application Data

(63) Continuation-in-part of application No. 16/581,599, filed on Sep. 24, 2019, now Pat. No. 11,328,201, and
(Continued)

(51) Int. Cl.
*G06K 19/077* (2006.01)
*G06K 19/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; G06K 19/0707; G06K 19/0723;
(Continued)

(56) References Cited

U.S. PATENT DOCUMENTS 6,265,977 B1 * 7/2001 Vega ................ G06K 19/07788
340/572.7
6,614,392 B2 9/2003 Howard
(Continued)

FOREIGN PATENT DOCUMENTS

| CA | 3061878 A1 | 11/2018 |
|---|---|---|
| JP | 2008239282 | 10/2008 |
| WO | WO 2017/196190 A1 | 11/2017 |

OTHER PUBLICATIONS

International Patent Application No. PCT/US2020/023007, International Search Report and Written Opinion dated Jun. 15, 2020, 9 pages.
(Continued)

*Primary Examiner* — Seung H Lee

(57) ABSTRACT

The disclosure generally relates to networking infrastructure and, more particularly, to installing transient infrastructure for ubiquitous networking applications. A wireless gateway device is sent to physical premises with a parcel. After the wireless gateway device is delivered to the physical premises, a processor of the wireless gateway device draws power from the energy source to perform operations comprising executing program code stored in non-transitory processor-readable medium to establish a wireless communications connection with a network service through a first type of wireless communications interface. The wireless gateway device performs operations comprising establishing wireless communications with one or more wireless peripheral devices in the physical premises through the second type of wireless communications interface.

20 Claims, 10 Drawing Sheets

Related U.S. Application Data a continuation-in-part of application No. 16/383,353, filed on Apr. 12, 2019, now Pat. No. 10,872,286, said application No. 16/581,599 is a continuation of application No. 15/842,867, filed on Dec. 14, 2017, now Pat. No. 10,445,634, said application No. 16/383,353 is a continuation of application No. 15/842,861, filed on Dec. 14, 2017, now Pat. No. 10,262,255.

(60) Provisional application No. 62/821,366, filed on Mar. 20, 2019, provisional application No. 62/435,207, filed on Dec. 16, 2016, provisional application No. 62/434,218, filed on Dec. 14, 2016.

(51) Int. Cl.
| | | |
|---|---|---|
| *G06K 19/07* | (2006.01) | |
| *H04W 4/029* | (2018.01) | |
| *C09J 7/38* | (2018.01) | |
| *B32B 37/06* | (2006.01) | |
| *B32B 37/12* | (2006.01) | |
| *H04W 4/02* | (2018.01) | |

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC .. G06K 19/0716; H04W 4/029; H04W 4/027; H04W 4/80; H04W 4/70; C09J 7/38; C09J 2301/40; C09J 2301/124; C09J 2301/302; C09J 2463/00; C09J 2203/326; B32B 37/06; B32B 37/12; B32B 2457/00
See application file for complete search history.

(56) References Cited

U.S. PATENT DOCUMENTS

| | | | | |
|---|---|---|---|---|
| 6,972,682 | B2* | 12/2005 | Lareau | G06Q 10/08 340/568.1 |
| 9,015,652 | B2 | 4/2015 | Suenbuel et al. | |
| 9,182,231 | B2 | 11/2015 | Skaaksrud | |
| 9,189,226 | B2 | 11/2015 | Driesen et al. | |
| 9,740,976 | B2* | 8/2017 | Ozaki | G06K 19/07786 |
| 9,824,329 | B2 | 11/2017 | Stirling et al. | |
| 9,860,688 | B2 | 1/2018 | Kulkarni et al. | |
| 2003/0018927 | A1 | 1/2003 | Gadir et al. | |
| 2007/0049291 | A1 | 3/2007 | Kim et al. | |
| 2008/0018492 | A1 | 1/2008 | Ehrke et al. | |
| 2008/0239282 | A1 | 10/2008 | Zou et al. | |
| 2010/0082870 | A1 | 4/2010 | Tokuhara | |
| 2010/0299401 | A1 | 11/2010 | Lloyd | |
| 2011/0202554 | A1 | 8/2011 | Powilleit et al. | |
| 2013/0107770 | A1 | 5/2013 | Marsden et al. | |
| 2014/0006131 | A1 | 1/2014 | Causey et al. | |
| 2015/0154531 | A1 | 6/2015 | Skaaksrud | |
| 2016/0055454 | A1 | 2/2016 | Kazanchian | |
| 2016/0104099 | A1 | 4/2016 | Villamar | |
| 2016/0128043 | A1 | 5/2016 | Shuman et al. | |
| 2016/0233927 | A1 | 8/2016 | Wu | |
| 2016/0239791 | A1 | 8/2016 | Burch et al. | |
| 2016/0260059 | A1* | 9/2016 | Benjamin | H04W 4/027 |
| 2017/0006135 | A1 | 1/2017 | Siebel et al. | |
| 2017/0026488 | A1 | 1/2017 | Hao et al. | |
| 2017/0039666 | A1 | 2/2017 | Kuersten et al. | |
| 2017/0155703 | A1 | 6/2017 | Hao et al. | |
| 2017/0169688 | A1 | 6/2017 | Britt et al. | |
| 2018/0031256 | A1 | 2/2018 | Gillette et al. | |
| 2018/0041856 | A1 | 2/2018 | Lou et al. | |
| 2018/0046964 | A1 | 2/2018 | Leoni et al. | |
| 2018/0086306 | A1* | 3/2018 | Schmotzer | G08B 13/1427 |
| 2018/0137457 | A1 | 5/2018 | Sachs et al. | |
| 2018/0163095 | A1 | 6/2018 | Khoche | |
| 2018/0165568 | A1 | 6/2018 | Khoche | |
| 2018/0183874 | A1 | 6/2018 | Cook | |
| 2018/0262571 | A1 | 9/2018 | Akhtar | |
| 2018/0276650 | A1 | 9/2018 | Hillier | |
| 2018/0288013 | A1 | 10/2018 | Hennebert et al. | |

OTHER PUBLICATIONS

Viswanadham et al., "Lead Time Models for Analysis of Supply Chain Networks", pp. 1-10.
Shen et al., "A mobility framework to improve heterogeneous wireless network services" Inderscience Enterprises Ltd., 2011, pp. 60-69.
International Search Report and Written Opinion, International application No. PCT/US2019/042488 dated Nov. 5, 2019, 12 pages.
International Search Report and Written Opinion, International application No. PCT/US2019/046588 dated Jan. 6, 2020, 9 pages.
Iacono, Wireless Sensor Network Protocols, Universidad De Mendoza, Argentina, 2011.
M.A. Matin et al., Overview of Wireless Sensor Network, Intech, 2012 (http://dx.doi.org/10.5772/49376.1).
Cimino et al., "Wireless communication, identification, and sensing technologies enabling integrated logistics: a study in the harbor environment," Research Gate, Oct. 2015.
International Patent Application No. PCT/US2019/046588, International Preliminary Report on Patentability, dated Feb. 16, 2021, 7 pages.

* cited by examiner

TRANSIENT INFRASTRUCTURE FOR UBIQUITOUS NETWORK COMMUNICATIONS APPLICATIONS

FIELD OF THE DISCLOSURE

The disclosure generally relates to networking infrastructure.

BACKGROUND

The disclosure generally relates to networking infrastructure and, more particularly, to installing transient infrastructure for ubiquitous networking applications.

SUMMARY

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

I. Introduction

Figure 1A:
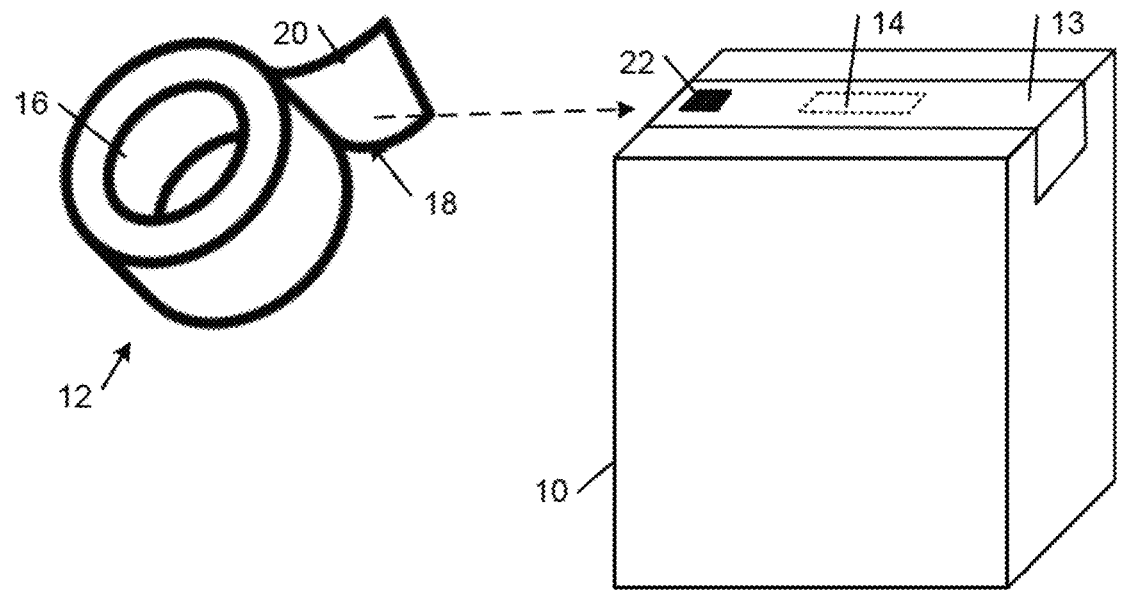
FIG. 1A is a diagrammatic view of a package that has been sealed for shipment using a segment of an example adhesive tape platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node can function, for example, as an adhesive tape, label, sticker, decal, or the like, and as a wireless communications device. A "peripheral" tape node (also referred to as an "outer" node, a "leaf" node, and "terminal" node) refers to a tape node that does not have any child nodes.

In certain contexts, the terms "parcel," "envelope," "box," "package," "container," "pallet," "carton," "wrapping," and the like are used interchangeably herein to refer to a packaged item or items.

This specification describes a low-cost, multi-function adhesive tape platform with a form factor that unobtrusively integrates the components useful for implementing a combination of different functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into a wide variety of applications and workflows, including person and object tracking applications, and asset management workflows such as manufacturing, storage, shipping, delivery, and other logistics associated with moving products and other physical objects, including sensing, tracking, locationing, warehousing, parking, safety, construction, event detection, road management and infrastructure, security, healthcare, and other network service applications. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional network infrastructure coverage that prevent continuous monitoring, event detection, security, tracking, and other logistics applications across heterogeneous environments.

II. Adhesive Tape Platform

FIG. 1A shows an example package 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the package 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
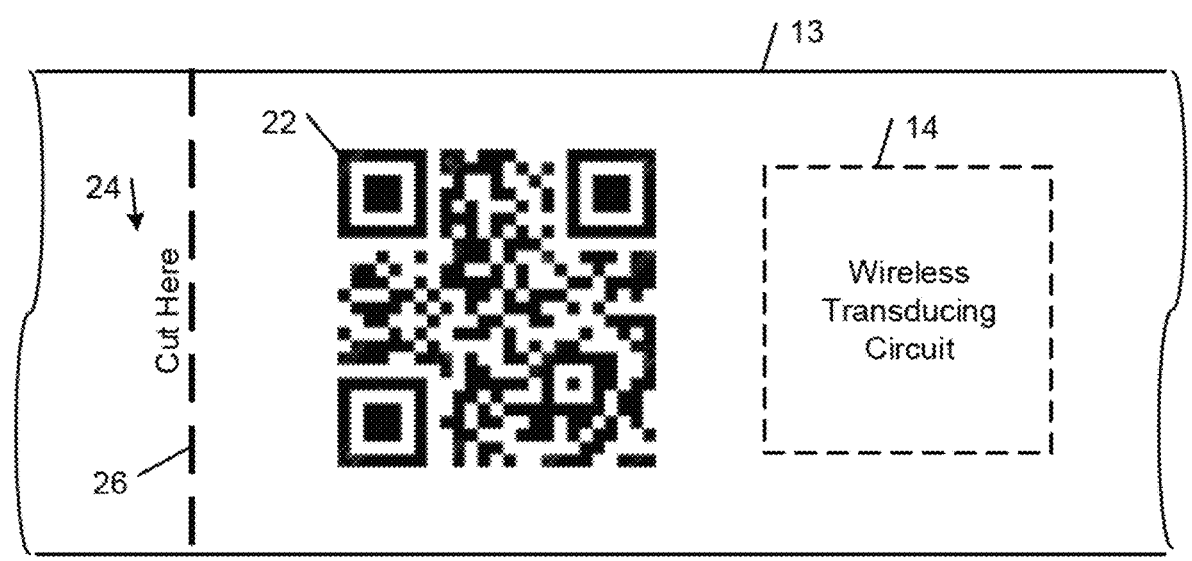
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the package 10 corresponds to a single segment of the adhesive tape platform 12. In other examples, the length of the adhesive tape platform 12 needed to seal a package or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the package 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
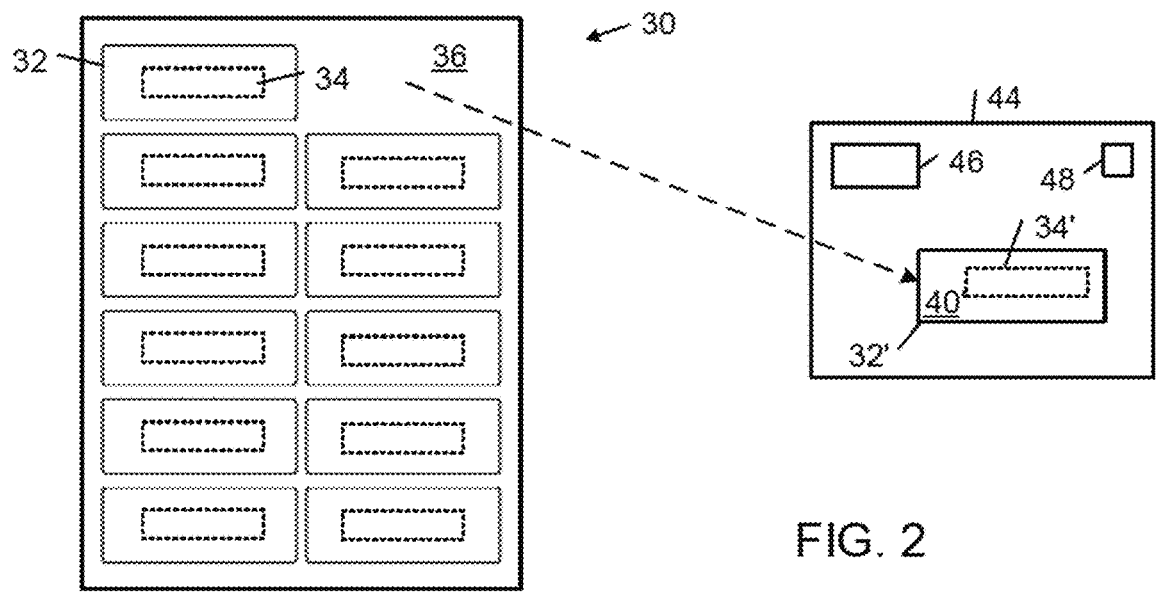
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
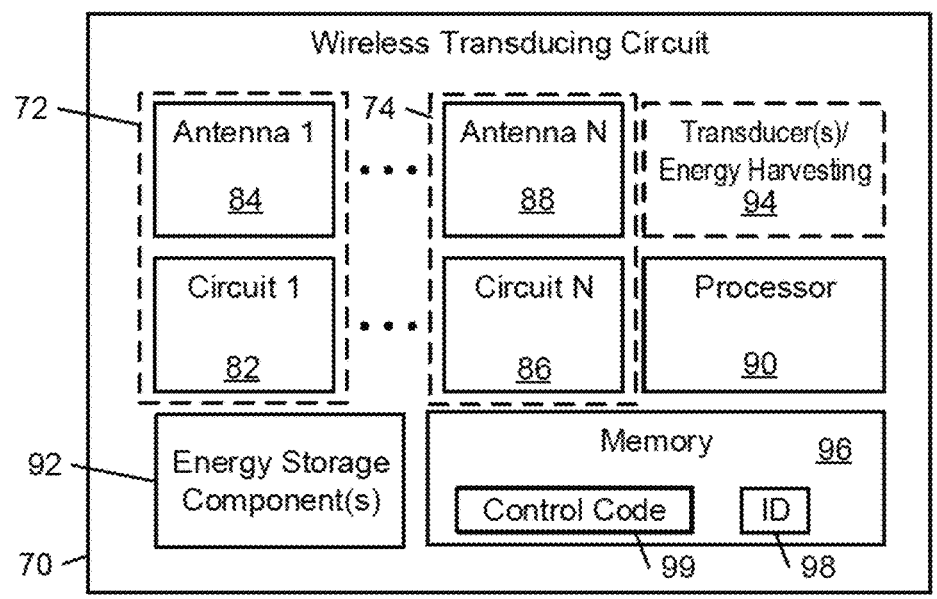
FIG. 3 is a schematic view of an example segment of an adhesive tape platform.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
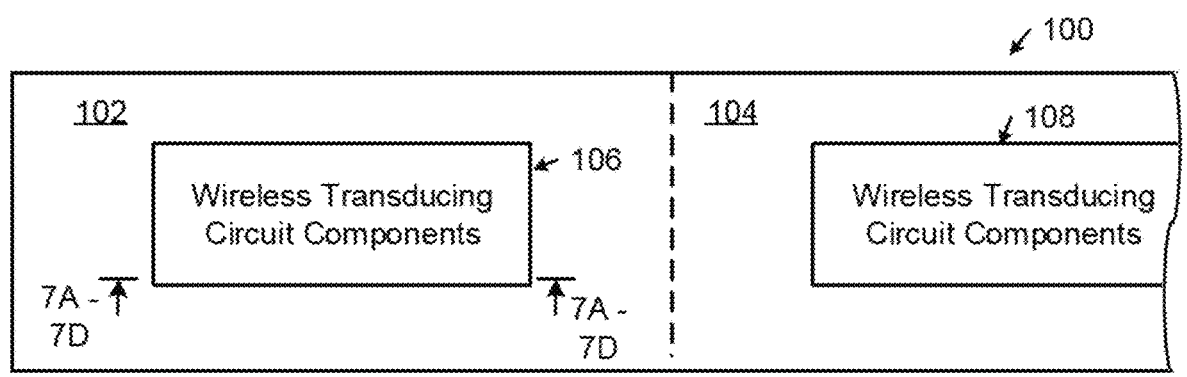
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes example systems of adhesive tape platforms (also referred to herein as "tape nodes") that can be used to implement low-cost wireless network infrastructure for performing monitoring, tracking, and other logistic and non-logistic applications (including internet-of-things applications) and functions relating to, for example, parcels, persons, tools, equipment and other physical assets and objects. The example system includes a set of different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
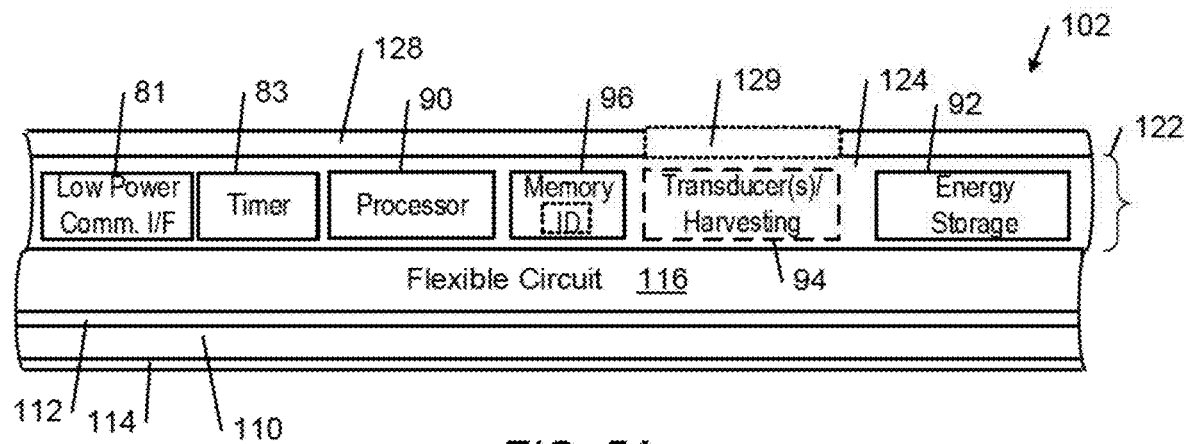
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white; referred to herein as a "peripheral tape node"). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communications interface 81 (e.g., a Zigbee, Bluetooth® Low Energy (BLE) interface, or other low power communications interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communications interface 81 typically includes one or more of the antennas 84, 88 and one or more of the wireless circuits 82, 86.

Figure 5B:
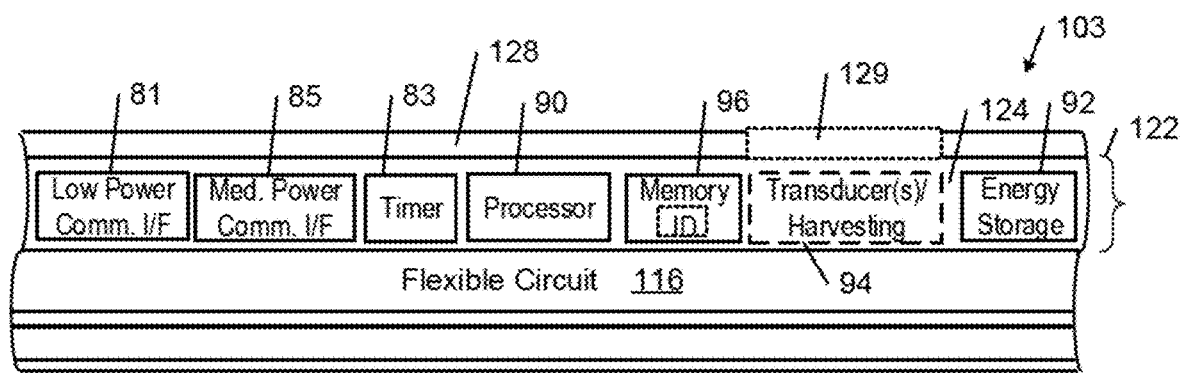

FIG. 5B shows a cross-sectional side view of a portion of an example segment 103 of the flexible adhesive tape platform 100 that includes a respective set of the components of the wireless transducing circuit 106 corresponding to the second tape node type (i.e., green; referred to herein as an "intermediate tape node"). In this example, the flexible adhesive tape platform segment 103 differs from the segment 102 shown in FIG. 5A by the inclusion of a medium power communications interface 85 (e.g., a LoRaWAN interface) in addition to the low power communications interface that is present in the first tape node type (i.e., white). The medium power communications interface has longer communication range than the low power communications interface. In some examples, one or more other components of the flexible adhesive tape platform segment 103 differ, for example, in functionality or capacity (e.g., higher capacity energy source).

Figure 5C:
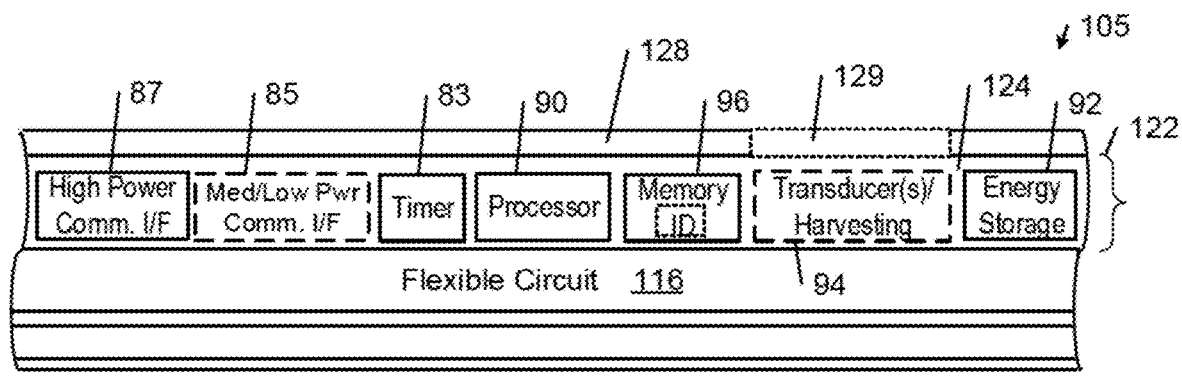

FIG. 5C shows a cross-sectional side view of a portion of an example segment 105 of the flexible adhesive tape platform 100 that includes a respective set of the components of the wireless transducing circuit 106 corresponding to the third tape node type (i.e., black; referred to herein as a "master tape node"). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., higher capacity energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018, the entire contents of which are incorporated herein by reference.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communications interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

In some examples, an adhesive tape platform includes a one-time wake circuit that delivers power from a respective energy source to a respective wireless circuit (e.g., a circuit comprising a processor, one or more transducers, and one or more wireless communications circuits) in response to an event that wakes the one-time wake circuit. Additional details regarding the structure and operation of examples of the one-time wake circuit are disclosed in U.S. Provisional Application No. 62/764,839, filed Aug. 16, 2018, U.S. Provisional Application No. 62/701,608, filed Jul. 20, 2018, and U.S. application Ser. No. 15/842,861, filed Dec. 14, 2017, which are incorporated herein by reference.

III. Transient Infrastructure for Ubiquitous Network Communications

The following disclosure describes low-cost transient communications infrastructure that enables ubiquitous network communications applications.

Figure 6:
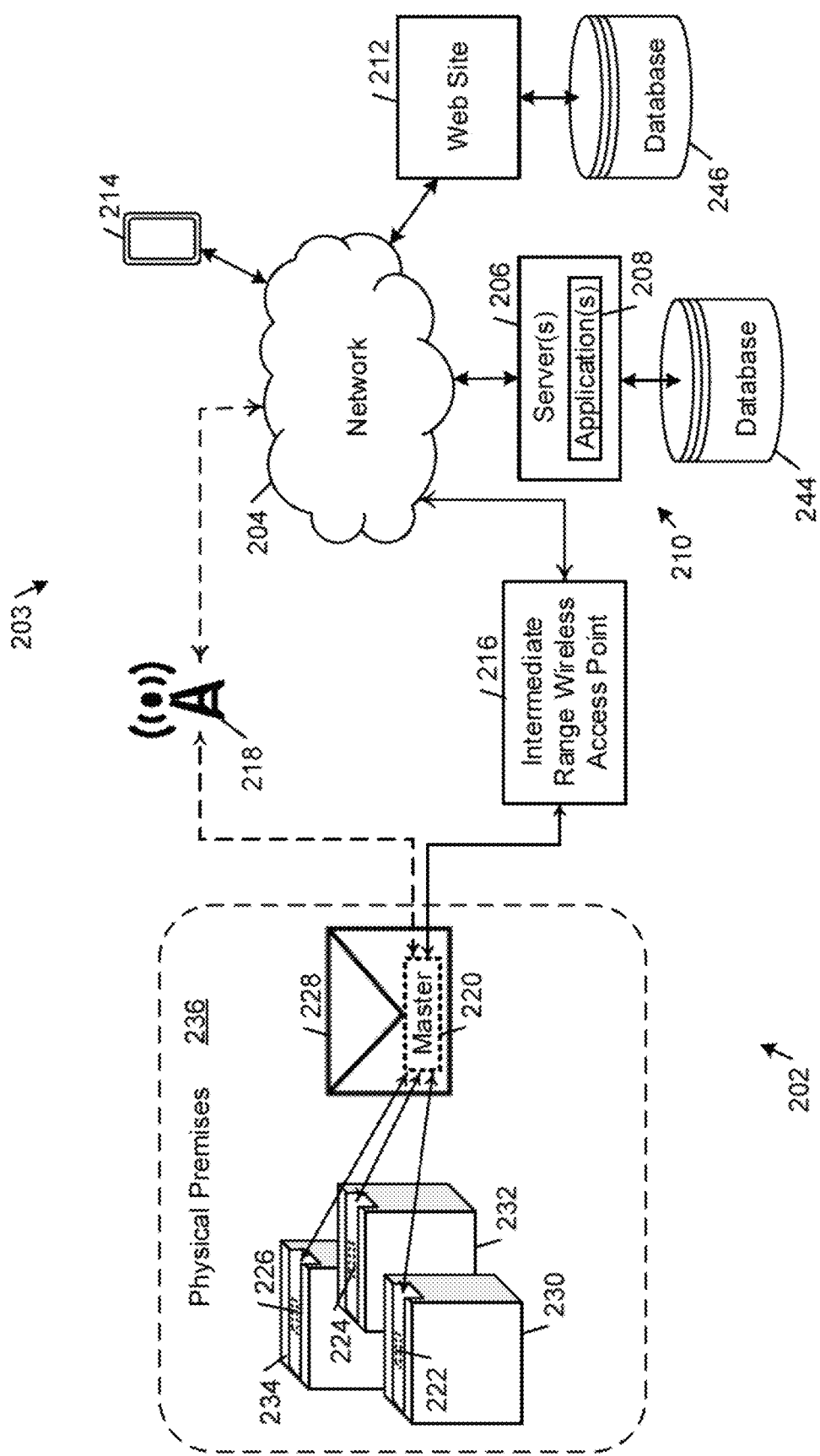
FIG. 6 is a diagrammatic view of example transient network infrastructure in physical premises communicating with a network service.

FIG. 6 shows an example of a network communications environment 200 that includes an architectural platform 202 on which a wide variety of different applications can be implemented, including, for example, internet-of-things applications. In the illustrated embodiments, the architectural platform 202 includes a persistent distributed network service infrastructure 203 and a transient physical premises network infrastructure.

The persistent distributed network service infrastructure includes a network 204 (e.g., the internet) that supports communications with one or more servers 206 executing one or more applications 208 of a network service 210, a web site 212 associated with the network service 210, a computing device 214 (e.g., a mobile phone, a tablet or laptop computer, or the like), and optionally one or more access points including an intermediate range wireless access point 216 (e.g., a LoRaWAN) and a cellular access point 218. In some examples, the persistent distributed network service infrastructure includes one or more network communication systems and technologies, including any one or more of wide area networks, local area networks, public networks (e.g., the internet), private networks (e.g., intranets and extranets), wired networks, and wireless networks. The persistent distributed network service infrastructure also may include communications infrastructure equipment, such as a geolocation satellite system (e.g., GPS, GLONASS, and NAVSTAR), cellular communication systems 218 (e.g., GSM/GPRS), Wi-Fi communication systems, and RF communication systems 216 (e.g., LoRaWAN).

In the illustrated example, the network service 210 includes a user application that executes on a client device 214 to enable an employee of the network service 210 to configure and retrieve status and sensor data from components (e.g., wireless network devices, also referred to as "network nodes") of the transient network infrastructure in the physical premises 236. The disclosed embodiments utilize different types of network nodes to collect data from the physical premises 236, including master network nodes, intermediate, and peripheral network nodes. Examples of the types of data that may be collected by the network nodes include parcel status information, event data, and sensor data (e.g., temperature data, acceleration data, location data, etc.). The network service 210 stores in an end-user database 244 user account information and data obtained from the master node 220 and the peripheral nodes 222-226. In the illustrated example, users of the network service 210 may use a web browser application to access the web site 212, which provides access to a database 246 that stores end-user data for each user of the web site 212. In the example shown in FIG. 6, users can access the web site 212 to obtain information regarding, for example, the shipping status and/or condition of their parcels, as well as other information concerning the users' parcels and other items.

The physical premises 236 may be, for example, any location in which there are persons, places or things to be monitored, tracked, sensed, or inventoried, including a warehouse, a distribution center, a manufacturing establishment, a supplier establishment, a customer establishment, a retail establishment, a restaurant, an apartment building, a hotel, a house, or other dwelling or defined space.

In general, the transient network infrastructure can be implemented by a wide variety of wireless network nodes. In some embodiments, the transient network infrastructure includes various types of tape nodes in the physical premises 236, including a master tape node 220 (e.g., the third tape node type 105; shown in FIG. 5C), one or more intermediate tape nodes (e.g., the second tape node type 102; shown in FIG. 5B), and peripheral tape nodes 222, 224, 226 (e.g., the first tape node type 102; shown in FIG. 5A). In some examples, multiple classes or types of tape nodes are used to implement a particular application, where each tape node class has a different respective set of roles, functionalities and/or capabilities. In some examples, the master node 220 and peripheral tape nodes 222, 224, 226 communicate in the physical premises 236 over local channels implemented using low-power wireless communications interfaces, such as a Bluetooth communication interface (e.g., a Bluetooth Low Energy system), a Z-wave communication interface, and a ZigBee communication interface.

The master tape node 220, the intermediate tape nodes, the peripheral tape nodes 222-228, and other types of tape nodes may be associated with any person, place, or thing. In the embodiment shown in FIG. 6, the master tape node 220 is associated with a parcel 228 and the peripheral tape nodes 222-226 are associated with respective parcels 230-234. In some examples, the peripheral tape nodes 222-226 may be implemented as respective segments of shipping tape that seal the parcels 230-234 (e.g., boxes). In other examples, the peripheral tape nodes 222-226 may be implemented as shipping labels. The master tape node 220 may be implemented as a segment of adhesive tape, a label, or other form. In some examples, the master tape node 220 may be contained within the parcel 228 (e.g., an envelope) in the form of a segment of adhesive tape with a release liner. In other examples, the master tape node 220 may be adhered to the exterior of the parcel 228 in the form of a shipping label. The peripheral tape nodes 222-226 typically are associated with parcels that contain assets (e.g., goods), and the master tape node 220 is a replaceable transient network infrastructure component in the physical premises 236.

In some examples, the network service 210 leverages the above-mentioned communications technologies (e.g., the peripheral, intermediate, and master tape node types 102, 103, 105; FIGS. 5A-5C) to create a hierarchical wireless network of tape nodes that improves asset management operations by reducing costs and increasing efficiencies in a wide range of processes, from asset packaging, asset transporting, asset tracking, asset condition monitoring, asset inventorying, and asset security verification.

Communication across the network communications environment 200 is secured by a variety of different security mechanisms. In the case of existing infrastructure, a communication link uses existing infrastructure security mechanisms. In the case of communications among tapes nodes, communication is secured through a custom security mechanism. In certain cases, tape nodes can also be configured to support block chain based security measures that protect the transmitted and stored data.

Figure 7:
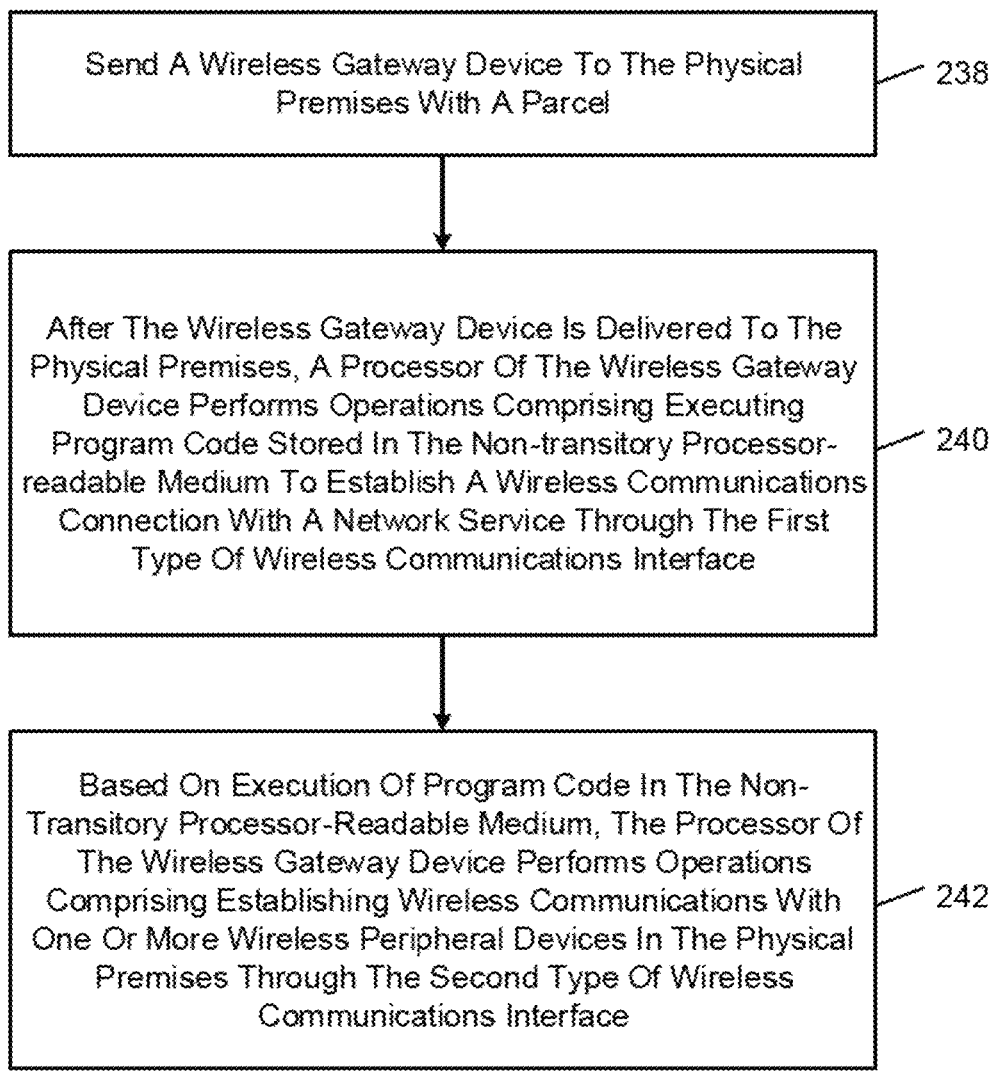
FIG. 7 is a flow diagram of an example method of installing transient wireless network infrastructure that enables wireless communications in physical premises.

Referring to FIG. 7, in some embodiments, the network service 210 configures the transient network infrastructure in the physical premises 236 as follows.

The network service sends a wireless gateway device (e.g., the master tape node 220) to the physical premises 236 (FIG. 7, block 238). In some embodiments, the wireless gateway device includes a first type of wireless communications interface (e.g., a medium or long range communications interface, such as LoRaWAN or a cellular communications interface), a second type of wireless communications interface (e.g., a short-range communications interface, such as Bluetooth LE), a processor coupled to the first type of wireless communications interface, and an energy source coupled to the processor, the first and second types of wireless communications interfaces, and a non-transitory processor-readable medium comprising processor-readable program code.

In some examples, the master tape node 220 is deployed (e.g., delivered by a parcel delivery service) to the physical premises 236 to serve as a transient low-cost gateway that is configured to communicate wirelessly with the peripheral tape nodes 222-226 and the network service 210. The master tape node typically is sent to the physical premises 236 before the parcels 230-234 carrying the peripheral tape nodes 222-226 are scheduled to arrive at the physical premises 236. In the illustrated example, the master tape node 220 is programmed by the network service 210 to operate as a gateway that is configured to send messages to and receive messages from the peripheral tape nodes 222-226 and the network service 210 over the persistent distributed network service infrastructure of the network platform 202. In some embodiments, the master tape node 220 also is configured or process data and detect and respond to defined events (e.g., sensor data above or below prescribed thresholds). The master tape node 220 may be programmed or re-programmed with operating instructions by the network service 210 before and/or after arriving at the physical premises 236.

In some embodiments, the network service 210 ships the master tape node 220 to the physical premises 236 using a conventional shipping carrier (e.g., US Postal Service, Federal Express, United Parcel Service, and DHL Express). The master tape node 220 may be shipped to the physical premises 236 in a conventional envelope 228 along with printed instructions to keep the master tape node 220 in the physical premises 236 (e.g., in a mailroom holding cage, a manager's office, or some other place on the physical premises where it will not be lost, stolen, damaged, or otherwise become unavailable). In some examples, the printed instructions additionally indicate that the master tape node 220 should be located within a prescribed wireless communications range of a parcel receiving, holding, or processing area in the physical premises 236 so that the master tape node 220 can wirelessly scan and identify parcels associated with the network service 210 and report the presence, condition, and status of the parcels to the network service 210.

Referring back to FIG. 7, after the wireless gateway device 220 is delivered to the physical premises 236, the processor of the wireless gateway device performs operations comprising executing program code stored in the non-transitory processor-readable medium to establish a wireless communications connection with the network service 210 through the first type of wireless communications interface (FIG. 7, block 240). In some examples, the master tape node 220 is activated (i.e., configured to draw electrical power from an internal power source) before being shipped. In other examples, the master tape node 220 is shipped in an unpowered state, in which case the master tape node may be shipped to the physical premises 236 with printed instructions for activating the master tape node 220 (e.g., by cutting or tearing a designated end portion of the master tape node 220 to enable the electronic circuitry in the master tape node 220 to draw electrical power from an internal power source). In some examples, more than one master tape node 220 may be deployed to the physical premises 236. Once activated, the master tape node 220 periodically monitors its geographic location to determine when it has arrived at the programmed destination (e.g., the physical premises 236). In some examples, the master tape node 220 checks its GPS coordinates according to a programmed schedule (e.g., once per hour or once per day). After the master tape node 220 has arrived at GPS coordinates that coincide with a position within the boundaries of the physical premises 236, the master tape node 220 attempts to communicate with the network service 210.

In some examples, the master tape node 220 includes a short range communications interface (e.g., Bluetooth LE) that is used to communicate with the peripheral tape nodes 222-226, and one or more longer range communications interfaces that are used to communicate with one or more wireless access points, including the intermediate range wireless access point 216 (e.g., a LoRaWAN access point) and the cellular service 218, such as a 4G cellular data service (e.g., Mobile WiMAX, LTE) or 5G cellular data service. The master tape node 220 establishes a wireless connection with one of the intermediate range wireless access points 216, 218, which connects the master tape node 220 to the network 204 (e.g., the Internet) via an Internet Service Provider (ISP) that provides Internet service to the network service 210.

After establishing a communication connection with the network service 210, the master tape node 220 transmits to the network service 210 the master tape's unique identifier (ID), GPS location coordinates, battery level, and other relevant data (e.g., event data and sensor data). One or more of the applications 208 running on the server(s) 206 of the network service 210 are configured to receive and process the data transmitted by the master tape node 220. The processed data is then stored in the database 244 and associated with a particular account associated with the physical premises 236. The network service 210 also is configured to send to the master tape node 220 new or updated program instructions, configuration parameters, security protocols, and tape node information (e.g., identifiers of the peripheral tape nodes that are expected to arrive at the physical premises 236).

After the master tape node 220 has reported its current status to the network service 210, the master tape node 220 awaits the arrival of the expected parcels 230-234 carrying tape nodes associated with the network service 210 (e.g., peripheral, intermediate, and master tape nodes).

Referring back to FIG. 7, based on execution of program code in the non-transitory processor-readable medium, the processor of the master tape node 220 (i.e., wireless gateway device) performs operations comprising establishing wireless communications connections with one or more wireless peripheral devices 222, 224, 226 in the physical premises 236 through the second type of wireless communications interface (FIG. 7 block 242). In some embodiments, the master tape node 220 is configured to broadcast ping packets into the physical premises 236 according to a heartbeat protocol. The ping packets can be identified and processed by the peripheral tape nodes 222-226. When the peripheral tape nodes 222-226 are within the transmission range of the master tape node 220, they can receive the ping packets transmitted by the master tape node 220. In some examples, the peripheral tape nodes 222-226 are programmed to respond to the receipt of a ping packet by sending a response packet to the master tape node 220. After receiving a response packet from a peripheral tape node, the master tape node 220 can pair (i.e., establish a wireless connection) with the peripheral tape node to transmit or receive, for example, sensor data, control data, status data, or application data.

In some embodiments, the master tape node 220 is configured to process and/or aggregate the sensor data that is collected from the peripheral tape nodes 222-226. The master tape node 220 can upload the collected, processed, and/or aggregated data, or control data to the network service 210 either directly or through one or more intermediate range wireless access points 216 and/or the cellular access point 218. In some examples, the master tape node gateway 220 is configured to send, transmit, forward, or relay messages between the one or more servers 206 of the network service 210 and activated tape nodes 222, 224, 226 that are associated with respective assets (e.g., parcels 230, 232, 234).

In some examples, after being deployed in the physical premises 236, a set of tape nodes is configured by the network service 210 to create a hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem that takes into account the battery capacity of nodes, power consumption in various modes of operation, desired latency, external environment, etc. and can be solved using optimization methods, e.g., neural networks, artificial intelligence, and other machine learning computing systems that take expected and historical data to create an optimal solution and can create algorithms for modifying the system's behavior adaptively in the field.

The tape nodes may be deployed by automated equipment or manually. In some examples, master, intermediate, and peripheral tape nodes are separated from a roll or sheet and adhered to respective parcels. The peripheral tape nodes 220-226 typically are adhered to respective parcels, whereas the master tape node 228 typically is placed in a secure location in the physical premises 236 where it can communicate with peripheral network nodes in the physical premises 236. In some examples, multiple master tape nodes are distributed across the physical premises 236 to achieve complete (e.g., overlapping) wireless coverage. In some examples, one or more master tape nodes are adhered to stationary objects (e.g., a structural element of a building, such as a distribution center, a warehouse, or rooms of a hotel or apartment building). In some examples, the process of separating a tape node from a roll or sheet activates the tape node and causes the tape node to communicate with a server 206 of the network service 210. In some examples, the tape node may communicate through one or more other tape nodes in the communication hierarchy. In this process, the server 206 executes one or more of the network service applications 208 to programmatically configure tape nodes that are deployed in the physical premises 236.

The master tape nodes, intermediate tape nodes, and peripheral tape nodes typically operate autonomously. In some examples, the master tape node and peripheral tape nodes may sleep and wake-up according to predetermined time schedules or in response to occurrence of an event, such as a sensor output above a threshold (e.g., an acceleration or temperature above respective acceleration and temperature thresholds). In some examples, upon arrival in the physical premises 236, a master tape node is programmed to broadcast a wireless signal on a particular channel to wake-up and communicate with other tape nodes in the physical premises 236. In some examples, the master tape node is configured to request the identifiers of the other tape nodes and optionally their status and sensor data.

The network service 210 can configure the transient network infrastructure to support a wide variety of applications.

In an example application, the network service 210 configures the transient network infrastructure to determine whether a parcel is ready for pickup at a designated physical premises 236 (e.g., a parcel pickup location). In this example, a master tape node is programmed to respond to API (Application Programming Interface) requests that are received from the network service 210. For example, a customer might use an application on the mobile device 214 or other network-enabled computing device to access the web site 212 to determine whether a particular parcel has arrived at a particular physical premises 236, such as a parcel pickup location (e.g., a retail store or warehouse). In response, a network operating layer component of the network service 210 determines the communication channel and scheduled wake time (e.g., a particular periodic time interval) for a target peripheral tape node attached to the particular parcel. The network service 210 instructs a master tape node in the particular pickup location to broadcast a ping message into the particular physical premises 236 over the determined communication channel during the scheduled wake time and send back to the network service a message indicating whether or not the master tape node has received a response message from the target peripheral tape node. In some embodiments, in response to receipt of a response message from the target peripheral tape node, the network service 210 instructs the master tape node to pair with the identified target peripheral tape node and retrieve state data, event data and/or sensor data from the identified target peripheral tape node. After successfully pairing with the target peripheral tape node, the master tape node retrieves information from the target peripheral tape node, including the state of the peripheral tape node, events detected, and sensor data stored in the target peripheral tape.

In another example application, the network service 210 configures the transient network infrastructure to determine when a particular parcel sent by supplier arrives in a designated physical premises 236 (e.g., a retail establishment, such as a pharmacy) and transmit back to the supplier the time of arrival and a record of the status and state of the parcel over time. In this example, a master node in the physical premises 236 receives from the network service 210 a communication channel and a scheduled wake time (e.g., a particular periodic time interval) for a target peripheral tape node attached to the particular parcel, and a time before the scheduled arrival time of the particular parcel to start detecting the arrival of the particular parcel. At the start time, the master node begins to periodically broadcast a ping message into the particular physical premises 236 over the determined communication channel during the scheduled wake time. After the master node receives a response message from the target peripheral tape node, the master node sends to the network service 210 a message indicating that the particular parcel has arrived in the designated physical premises 236. Responsive to instructions received from the network service 210, the master node pairs with the identified target peripheral tape node and retrieves state data, event data and/or sensor data from the identified target peripheral tape node. The master node sends the retrieved data to the network service 210. The network service 210 processes the received data and transmits a message to the retailer that reports, for example, the status of the shipment and the state of the contents of the parcel. In an example, the message may report that the parcel from the supplier arrived at the particular physical premises at 3 pm today, and there was a period of time (e.g., from 12:00 pm to 12:10 pm) during the shipment when a monitored parameter (e.g., temperature, acceleration, or pressure) exceeded the recommended threshold for the contents of the parcel.

Figure 8:
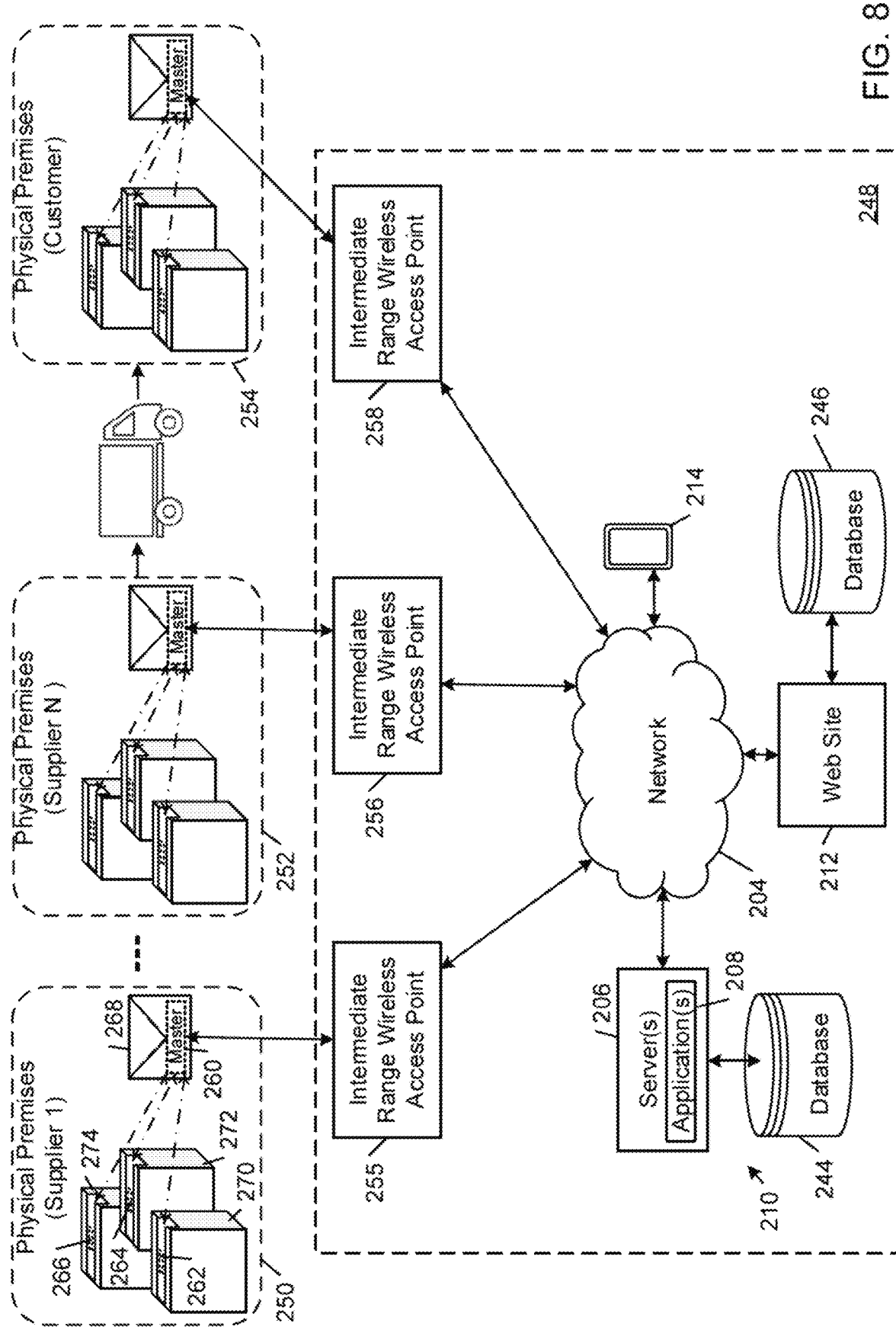
FIG. 8 is a diagrammatic view of example transient network infrastructure in physical premises communicating with a network service.

Referring to FIG. 8, in some embodiments, the network service 210 monitors the values of various performance metrics at respective supply chain nodes to develop statistical or machine learning models that are operable to predict, for example, lead times, times of arrival, and throughput variability across each route, carrier, and each supplier.

In the illustrated embodiment, the architectural platform includes a persistent distributed network service infrastructure 248 and multiple transient physical premises network infrastructures located at respective physical premises 250, 252, 254. The persistent distributed network service infrastructure 248 is essentially the same in structure as the persistent distributed network service infrastructure 203 shown in FIG. 6, except for the inclusion of the two additional intermediate range wireless access points 256, 258. The persistent distributed network service infrastructure 248 includes a network 204 (e.g., the internet) that supports communications with one or more servers 206 executing one or more applications 208 of a network service 210, a web site 212 associated with the network service 210, a computing device 214 (e.g., a mobile phone, a tablet or laptop computer, or the like), and optionally one or more intermediate range wireless access points 255, 256, 258 (e.g., a LoRaWAN and/or a cellular access point 218). In some examples, the persistent distributed network service infrastructure includes one or more network communication systems and technologies, including one or more of wide area networks, local area networks, public networks (e.g., the internet), private networks (e.g., intranets and extranets), wired networks, and wireless networks. The persistent distributed network service infrastructure also may include communications infrastructure equipment, such as a geolocation satellite system (e.g., GPS, GLONASS, and NAVSTAR), cellular communication systems 218 (e.g., GSM/GPRS), Wi-Fi communication systems, and RF communication systems 216 (e.g., LoRaWAN).

In the illustrated example, the network service 210 includes a user application that executes on a client device 214 to enable an employee of the network service 210 to configure and retrieve status and sensor data from network infrastructure components in each of the transient physical premises 250, 252, 254. Examples of the types of data that may be collected include parcel status information, event data, and sensor data (e.g., temperature data, acceleration data, location data, etc.). The network service 210 stores user account information and data obtained from the master node 260 and the peripheral nodes 262-266 in each of the physical premises 250, 252, 254 in an end-user database 244. In the embodiment shown in FIG. 8, the master tape node 260 is associated with a parcel 268 and the peripheral tape nodes 262-266 are associated with respective parcels 270-274. In the illustrated example, users of the network service 210 may use a web browser application to access the web site 212, which provides access to a database 246 that stores end-user data for each user of the web site 212. In the illustrated example, users can access the web site 212 to obtain information regarding, for example, the shipping status and/or condition of their parcels, as well as other information concerning the users' parcels and other items.

In the illustrated embodiment, the network service 210 is configured to monitor the values of various performance metrics at and between respective supply chain nodes to develop models for predicting lead times, times of arrival, and throughput variability for each supplier, carrier, port, lane, road, manufacturing facility, warehouse, and other node in the supply chain. In this embodiment, the network service 210 uses master tape nodes, intermediate tape nodes, and peripheral tape nodes throughout the supply chain to model the lead time behavior of a customer 254. In this process, the network service 210 collects data from the tape nodes and analyzes the collected data to learn how the customer's lead time functions between supply chain nodes for multimode shipping lanes, lead and/or cycle time for operations within supply chain nodes, and the dwell time within each supply chain node.

In some embodiments, the network service 210 uses data collected from the deployed tape nodes to evaluate supply chain performance between supply chain nodes by evaluating various performance metrics. Example performance metrics include the average delay caused by unscheduled stops for each carrier, and the dwell times at respective ports as a function of the number of vessels waiting at the same time. The network service 210 also uses data collected from the deployed tape nodes to evaluate performance of activities within a supply chain node, such as manufacturing operations and warehouse operations. Example performance metrics for evaluating performance within a supply chain node include the length of time it takes to unload a truck into a warehouse as a function of different warehouse fill levels and different numbers of working staff. In some embodiments, the network service 210 uses data collected from the deployed tape nodes to determine the variability for each lane, route and node in the customer's supply chain. The variability information typically is used to determine the required levels of inventory and staff throughout the supply chain.

In some embodiments, the network service 210 monitors the performance of each supplier and route in a supply chain, and analyzes performance metrics under varying conditions to generate statistical or other types of predictive models (e.g., machine learning models) of the physical premises of suppliers 1 to N and the customer. As a result, the network service 210 obtains visibility of lead time and variability across the entire supply chain. In some examples, the variability visibility is used by the network service 210 to select a different supplier (e.g., a supplier with a shorted lead time or lower variability) or dynamically select an alternative transportation route in real time.

Figure 9:
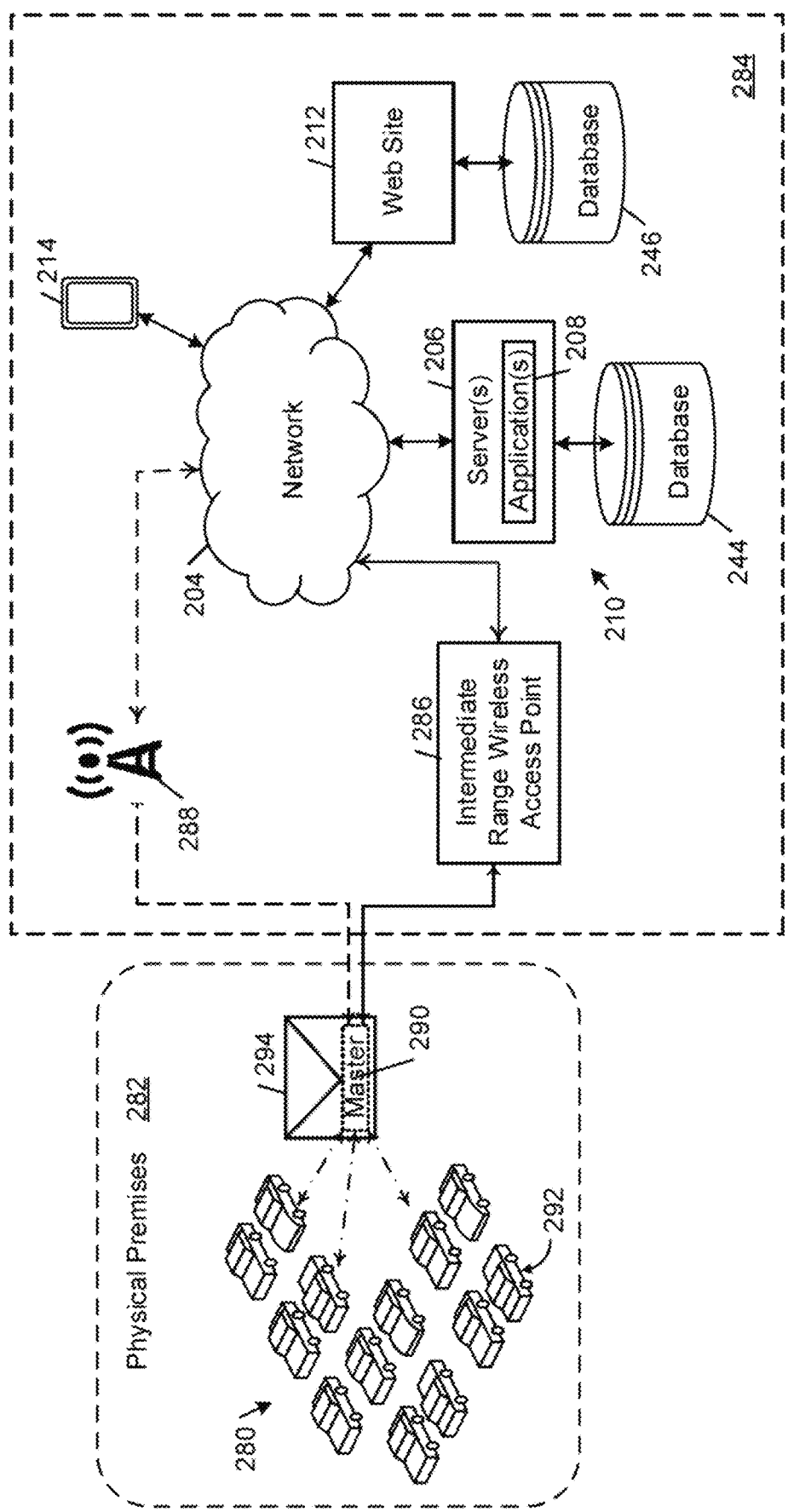
FIG. 9 is a diagrammatic view of example transient network infrastructure in physical premises communicating with a network service.

Referring to FIG. 9, in some embodiments, the network service 210 monitors one or more assets 280 in a physical premises 282. In general, the assets may be any type of movable goods, items, effects, or other things. In the example shown in FIG. 9, the physical premises 282 is a car dealership and the assets 280 are vehicles (e.g., cars) that serve as collateral for loans obtained from a lender (e.g., a bank) to purchase the vehicles.

In the illustrated embodiment, the architectural platform includes a persistent distributed network service infrastructure 284 and a transient physical premises network infrastructure located in the physical premises 282. The persistent distributed network service infrastructure 284 has essentially the same structural components as the persistent distributed network service infrastructure 203 shown in FIG. 6. The persistent distributed network service infrastructure 284 includes a network 204 (e.g., the internet) that supports communications with one or more servers 206 executing one or more applications 208 of a network service 210, a web site 212 associated with the network service 210, a computing device 214 (e.g., a mobile phone, a tablet, laptop computer, or the like), and optionally one or more intermediate range wireless access points 286, 288 (e.g., a LoRaWAN access point 286 and/or a cellular access point 288). In some examples, the persistent distributed network service infrastructure includes one or more network communication systems and technologies, including any one or more of wide area networks, local area networks, public networks (e.g., the internet), private networks (e.g., intranets and extranets), wired networks, and wireless networks. The persistent distributed network service infrastructure also may include communications infrastructure equipment, such as a geolocation satellite system (e.g., GPS, GLONASS, and NAVSTAR), cellular communication systems 288 (e.g., GSM/GPRS), Wi-Fi communication systems, and RF communication systems 286 (e.g., LoRaWAN).

In the illustrated example, the network service 210 includes a user application that executes on a client device 214 to enable an employee of the network service 210 to configure and retrieve status and sensor data from network infrastructure components in the transient physical premises 282, including one or more master tape nodes 290 and peripheral tape nodes 292. Examples of the types of data that are collected by the tape nodes include vehicle status information (e.g., detected or not detected within the physical premises 282), event data (e.g., door or window opened/closed), and sensor data (e.g., temperature data, moisture data, acceleration data, location data, etc.). The network service 210 stores user account information and data obtained from the master tape node 290 and the peripheral tape nodes 292 in an end-user database 244. In the illustrated example, users of the network service 210 may use a web browser application to access the web site 212, which provides access to a database 246 that stores end-user data for each user of the web site 212. In the illustrated example, users can access the web site 212 to obtain information regarding, for example, the inventory of vehicles on the physical premises 282 and any notifications regarding the status of the vehicles 280, including the presence of the vehicles 280 on the physical premises 282, and potential damage to the vehicles 280.

In the embodiment shown in FIG. 9, the master node 290 is a master tape node that is associated with a parcel 294 (e.g., an envelope) that may be located in any suitable environment within wireless communications range of the vehicles 280 that does not prevent the master tape node 290 from establishing wireless connections with the peripheral tape nodes. In some examples, the parcel 294 is located in a building or other structure within wireless range of the vehicles on the physical premises 282. In other examples, the master node 290 is implemented as a standalone wireless communications device that has essentially the same functionality as the master tape node 306. For example, in some embodiments the master node 306 is implemented by line-powered device circuitry and other components enclosed within a rigid casing.

The peripheral tape nodes 292 typically are attached or otherwise physically associated with the vehicles 280 on the physical premises 282. In some examples, the peripheral tape nodes 292 are adhered to the exteriors of the vehicles 280 (e.g., on the vehicle chassis).

In an example application, the network service 210 configures the transient network infrastructure in the physical premises 282 to determine when a particular vehicle 282 has moved off the physical premises 282. In this example, the master node 290 receives from the network service 210 a respective communication channel identifier and a respective scheduled wake time (e.g., a particular periodic time interval) for each peripheral tape node 292 that is associated with a respective one of the vehicles. After receiving the scheduled wake time, the master node begins to periodically broadcast ping messages into the particular physical premises 282. In one embodiment, each ping message is addressed to a respective one of peripheral tape nodes and transmitted over the respective communication channel during the scheduled wake time for the respective peripheral tape node. After the master node 290 receives a response message from the target peripheral tape node 292, the master node 290 sends to the network service 210 a message indicating that the particular peripheral tape node was detected in the designated physical premises 236. In some examples, the master node 290 also pairs with the identified target peripheral tape node and retrieves historical state data, event data and/or sensor data from the memory of the respective peripheral tape node. The master node 290 sends the retrieved data to the network service 210. The network service 210 processes the received data and transmits a message to the lender that reports, for example, the status of the vehicle (e.g., on the physical premises 282 or missing). In an example, the message may report that the vehicle was located on the physical premises 282 until 3 pm today when it was off the physical premises for 10 minutes before returning to the physical premises 282, and there was a period of time (e.g., 2 seconds) during which a monitored parameter (e.g., acceleration, temperature, etc.) exceeded the recommended threshold for the vehicle.

In some examples, the network service 210 responds to reports from the master node 290 according to a predetermined protocol. In accordance with an example protocol, the network service 210 initially responds to the failure to detect a particular vehicle on the physical premises 282 by logging the vehicle as being off the physical premises 282 and, after ten minutes have passed without detecting the vehicle, the network service sends an alert message to an employee of the car dealership. In accordance with another example protocol, the network service 210 responds to an alert message reporting an acceleration or deceleration event above a target threshold by sending a message to the car dealership reporting the detection of an acceleration event above a threshold acceleration level and recommending the vehicle be checked for damage. In another example, the network service 210 responds to an alert message reporting the detection of moisture or humidity above a target threshold by sending a message to the car dealership reporting the detection of a moisture event above a threshold moisture level and recommending that a window or door of vehicle 123 be checked for leakage.

Figure 10:
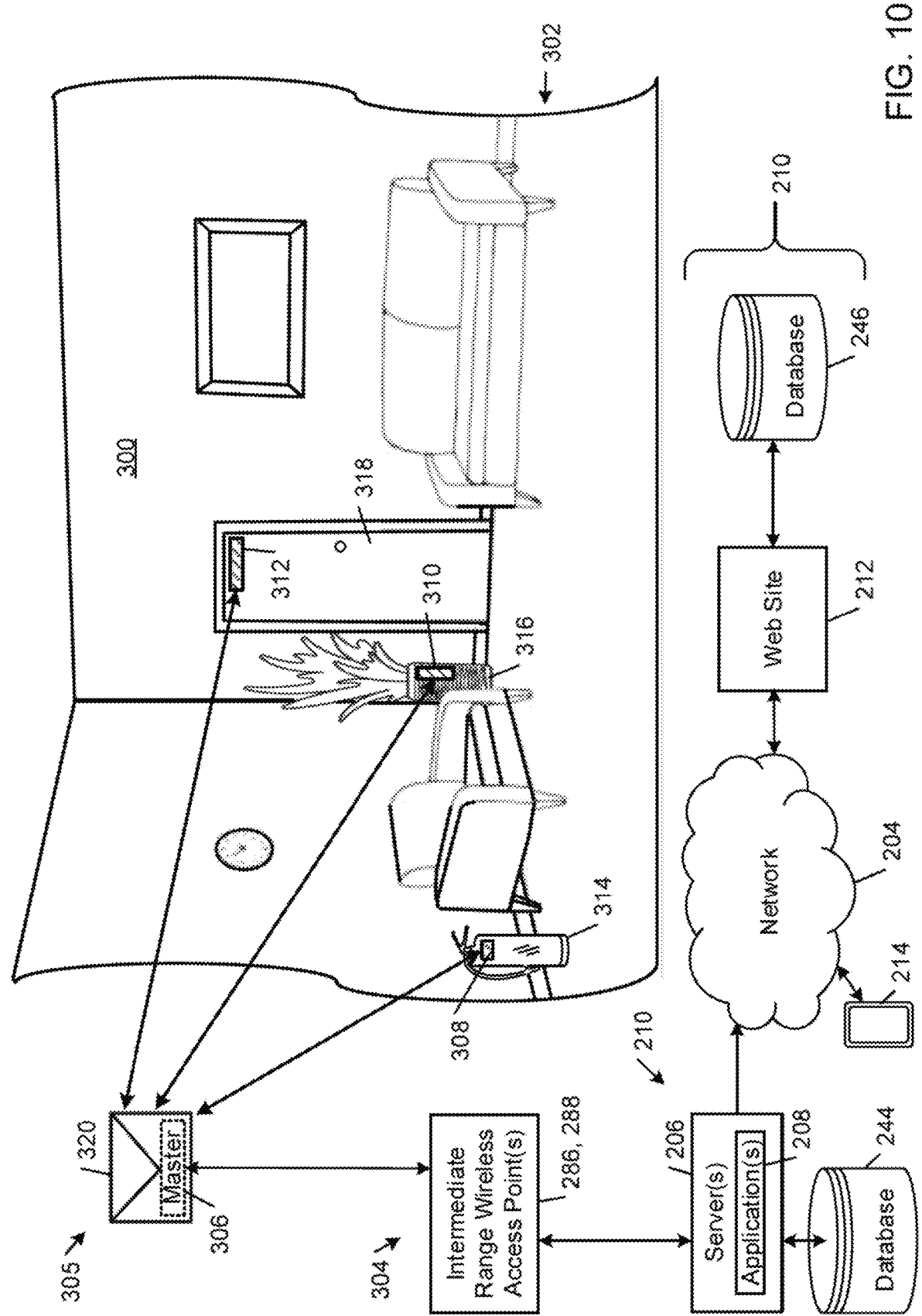
FIG. 10 is a diagrammatic view of example transient network infrastructure in physical premises communicating with a network service.

Referring to FIG. 10, the network service 210 monitors one or more assets in a room 300 of a multi-room building on physical premises 302. In general, the assets may be any type of movable goods, items, effects, or other things. In the illustrated embodiment, exemplary assets include a fire extinguisher 314, a potted plant 316, and a door 318.

In the illustrated embodiment, the architectural platform includes a persistent distributed network service infrastructure 304 and a transient physical premises network infrastructure 305 located in the physical premises 302. The persistent distributed network service infrastructure 304 has essentially the same structure as the persistent distributed network service infrastructure 203 shown in FIG. 6. The persistent distributed network service infrastructure 304 includes a network 204 (e.g., the internet) that supports communications with one or more servers 206 executing one or more applications 208 of a network service 210, a web site 212 associated with the network service 210, a computing device 214 (e.g., a mobile phone, a tablet or laptop computer, or the like), and optionally one or more intermediate range wireless access points 286, 288 (e.g., a LoRaWAN access point and/or a cellular access point). In some examples, the persistent distributed network service infrastructure 304 includes one or more network communication systems and technologies, including any one or more of wide area networks, local area networks, public networks (e.g., the internet), private networks (e.g., intranets and extranets), wired networks, and wireless networks. The persistent distributed network service infrastructure 304 also may include communications infrastructure equipment, such as a geolocation satellite system (e.g., GPS, GLONASS, and NAVSTAR), cellular communication systems 288 (e.g., GSM/GPRS), Wi-Fi communication systems, and RF communication systems 286 (e.g., LoRaWAN).

In the illustrated example, the network service 210 includes a user application that executes on a client device 214 to enable an employee of the network service 210 to configure and retrieve status, event, and sensor data from network infrastructure components in the transient physical premises 305, including a master tape node 306 and peripheral tape nodes 308, 310, 312. In the illustrated example, users of the network service 210 may use a web browser application to access the web site 212, which provides access to a database 246 that stores end-user data for each user of the web site 212. Users can access the web site 212 to obtain information regarding, for example, an inventory of the monitored assets in the physical premises 282 and any notifications regarding the state of the assets, including the presence of the assets in the room and alert conditions (e.g., a moved asset, a missing asset, a potentially damaged asset). Examples of the types of data that are collected by the peripheral tape nodes 308, 310, 312 include asset status information (e.g., the asset was or was not detected within the physical premises 302), event data (e.g., a fire extinguisher 314 was moved from its designated location, potted plant 316 is over or under watered, and the door 318 is opened or closed), and sensor data (e.g., temperature data, acceleration data, moisture/humidity data, location data etc.). The network service 210 processes and stores data obtained from the master tape node 306 and the peripheral tape nodes 308, 310, and 312 in an end-user database 244 associated with the user's account.

In the illustrated embodiment shown in FIG. 10, the master node 306 is a master tape node that is associated with a parcel 320 (e.g., an envelope). The parcel 320 typically is located in any suitable location in the room 300 that does not interfere with the ability of the master tape node 306 to establish wireless communications with the peripheral tape nodes 308, 310, 312. In other examples, In other examples, the master node 306 is implemented as a standalone wireless communications device that has essentially the same functionality as the master tape node 306. For example, in some embodiments the master node 306 is implemented by line-powered device circuitry and other components enclosed within a rigid casing.

The peripheral tape nodes 308, 310, 312 typically are attached or otherwise physically associated with the assets 314, 316, 318 in the physical premises 302. In the illustrated embodiment, the peripheral tape nodes 308, 310, 312 are adhered to the exterior surfaces of the assets 314, 316, 318.

In an example application, the network service 210 configures the transient network infrastructure in the physical premises 305 to determine when a particular vehicle 282 has moved off the physical premises 282. In this example, the master node 290 receives from the network service 210 a respective communication channel identifier and a respective scheduled wake time (e.g., a particular periodic time interval) for each peripheral tape node 308, 310, 312 that is associated with a respective one of the assets 314, 316, 318. After receiving the scheduled wake time, the master node 306 begins to periodically broadcast ping messages into the physical premises 302. In one embodiment, each ping message is addressed to a particular one of peripheral tape nodes 308, 310, 312 and transmitted over the respective communication channel during the scheduled wake time for the particular peripheral tape node 308, 310, 312. After the master node 306 receives a response message from the particular peripheral tape node 308, 310, 312, the master node 306 sends to the network service 210 a message indicating that the particular peripheral tape node 308, 310, 312 was detected in the physical premises 302. In some examples, the master node 306 also pairs with the particular peripheral tape node and retrieves historical state data, event data and/or sensor data from the memory of the particular peripheral tape node 308, 310, 312.

The master node 306 sends the retrieved data to the network service 210. The network service 210 processes the received data and transmits a message to the building management service that reports, for example, the status of the asset 314, 316, 318 (in the room 300, at its designated location within the room 300, not at its designated location within the room 300, or missing).

In an example, based on the data received from the master node 306 (e.g., accelerometer and temperature sensor data), the message from the network service 210 reports to the building management service that the fire extinguisher asset 314 is located within the room 300 at its designated location until 2:00 pm today when it was moved 10 feet from the designated location before returning to its designated location at 2:10 pm and there was a period of time (e.g., 3 seconds) during which the temperature rose 30 degrees Celsius, which corresponds to a threshold rate of temperature change that is consistent with a fire. In some examples, the network service 210 responds to reports from the master node 306 according to a predetermined protocol. In accordance with an example protocol, the network service 210 initially responds to the to the movement of the fire extinguisher asset 314 by logging the fire extinguisher as being out of its designated location in the room 300 and, after receiving the report of the temperature rising 30 degrees Celsius over a period of 3 seconds, the network service sends to an employee of the building management service an alert message reporting a potential fire in room 300.

In another example, based on the data received from the master node 306 (e.g., moisture sensor data), the message from the network service 210 reports to the building management service that the potted plant asset 316 in room 300 is located at its designated location within the room 300, and the moisture level associated with the potted plant asset 310 dropped below the target moisture threshold level at 7 am yesterday. In some examples, the network service 210 responds to reports from the master node 306 according to a predetermined protocol. In accordance with an example protocol, the network service 210 initially responds to the to the moisture level dropping below the target moisture level by logging the date and time when the moisture level dropped below the target threshold and, after receiving the current report that the moisture level was still below the target moisture level, the network service sends to an employee of the building management service an alert message reporting a potential dehydration of the potted plant in room 300.

In another example, based on the data received from the master node 306 (e.g., accelerometer data), the message from the network service 210 reports to the building management service that the door asset 318 in room 300 was opened at 2:11 pm today and has remained open since that time. In some examples, the network service 210 responds to reports from the master node 306 according to a predetermined protocol. In accordance with an example protocol, the network service 210 initially responds to the to the opening of the door asset 318 by logging the front door 318 of room 300 as being open at 2:11 pm and, after receiving a current report that the front door 318 of room 13 is still open at 2:30 pm, the network service sends to an employee of the building management service an alert message reporting a potential inadvertent open front door of room 300.

Figure 11:
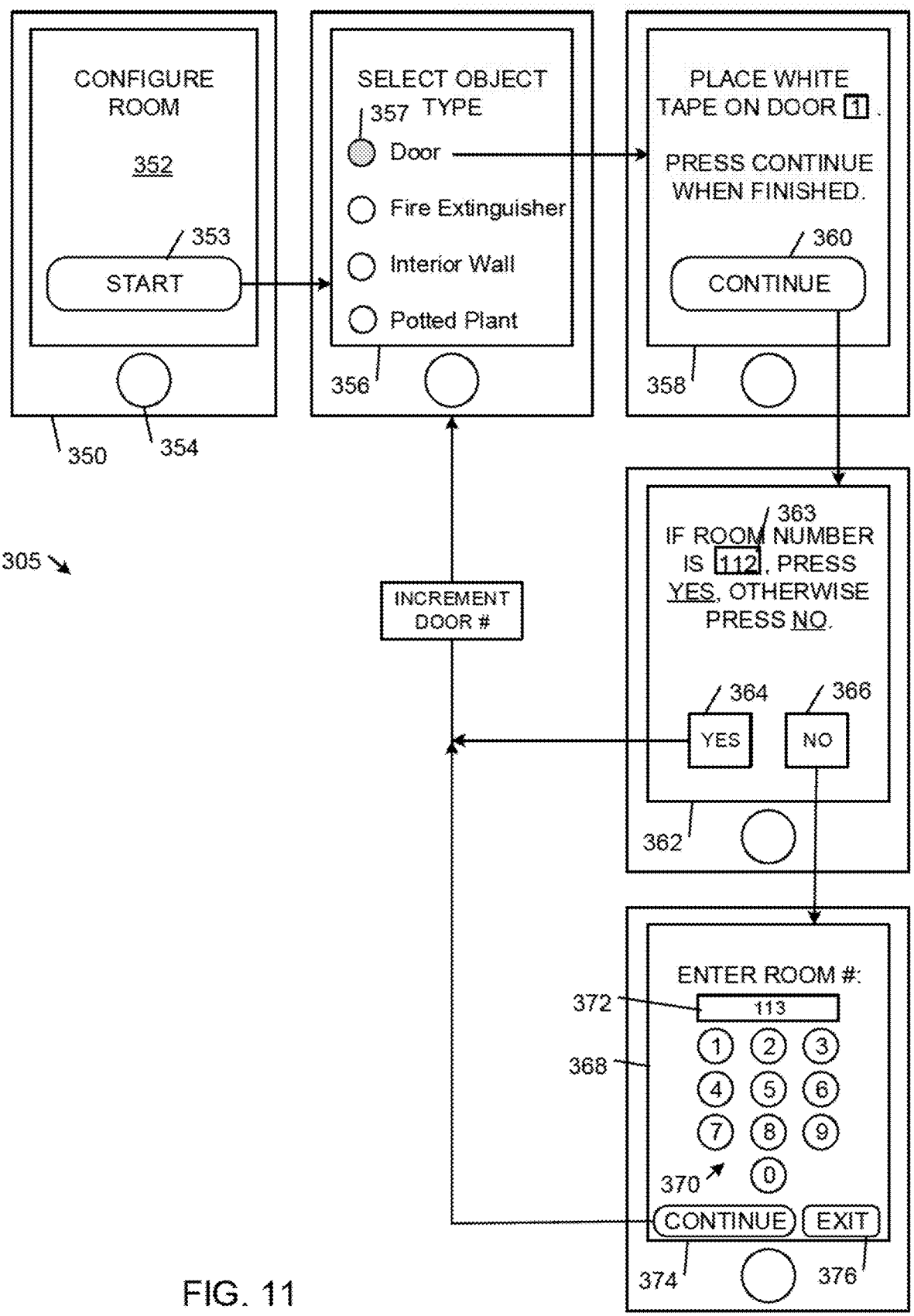
FIG. 11 is a diagrammatic view of an example user interface flow that guides a user through steps for installing transient wireless network infrastructure in physical premises.

FIG. 11 shows an example user interface flow of a wireless network infrastructure installation application executing on a mobile computing device 350 that guides a user through steps for installing transient wireless network infrastructure in physical premises. In some embodiments, the physical premises is multi-room residential building (e.g., a hotel, apartment building, condominium building, or a hospital). In the illustrated embodiment, the application displays a sequence of interface screens on the mobile computing device 350, which may be any type of portable computing device including, for example, a mobile phone, tablet computer, a laptop computer, or a head-mounted display. In general, the wireless network infrastructure installation application is operable to run on a variety of other computing platforms. In the illustrated embodiment, the mobile computing device 350 includes a touch-sensitive display screen 352 and a home button 354.

Launching the wireless network infrastructure installation application, displays a home screen that includes a Configure Room title and a START button 353. Touching the START button 353 takes the user to the SELECT OBJECT TYPE screen 356, which displays four radio buttons, one of which is selectable at any given time. Four different object types in the physical premises may be selected and configured in the example screen 356 shown in FIG. 11, including a door, a fire extinguisher, an interior wall of a room, an a potted plant. In the illustrated example, the user selected to configure an of the door type object. User selection of the radio button 357 associated with the Door object type takes the user to a screen 358 that includes instructions for installing the white peripheral tape type of wireless network infrastructure. In particular, the user is instructed to place the white peripheral type of tape node on a door of the room. In this process, the user typically cuts or tears off a segment of the white peripheral tape type of wireless network infrastructure tape, which activates the tape node by supplying sufficient electrical power to turn-on the components of the tape node. Since this is the first door that is configured with a tape node, the door is designated Door 1. The instructions on screen 358 further instruct the user to PRESS CONTINUE WHEN FINISHED installing the tape on Door 1.

In some examples, after the segment of the wireless network infrastructure tape node has been activated, the mobile computing device 350 transmits a ping message to the activated white tape node adhered to the Door 1. In some embodiments, the tape node is configured to send to the mobile computing device 350 a response message that includes the unique tape node ID that is stored in the memory component of the tape node. In some embodiments, one or both of the mobile computing device 350 and the tape node store the association between the tape node ID and the Door 1.

After the user touches the CONTINUE button 360 that is presented on the tape node placement screen 358, the application displays a confirmation screen 362. In some examples, after the user pressed the CONTINUE button 360, the wireless network infrastructure application running on the mobile computing device 350 configures one or more GPS components (e.g., a GPS receiver) of the mobile computing device 350 to obtain the current GPS coordinates of the computing device 350 via GPS signals received by the GPS antenna and the GPS receiver components. In some examples, the multi-unit building is associated with a predetermined mapping between GPS coordinates and respective rooms in the building. In these examples, the wireless network infrastructure application running on the mobile computing device 350 presents a confirmation screen 362 that asks the user to confirm that the Door number associated the current GPS coordinates received by the mobile computing device 350 and the displayed room number 363 is correct.

If the room numbers are the same (e.g., Room 112), the user touches the YES button 364 on screen 362, which causes the application to increment the door number (i.e., to Door 2). If, on the other hand, the room numbers disagree, the user touches the NO button 366 on screen 362. This takes the user to a screen 368 where the user can enter the room number manually using an interface 370. After entering the correct room number in the interface box 372, the user touches the CONTINUE button 374 to update the mapping between the GPS coordinates received by the mobile computing device 350 and the prior room number. Pressing the CONTINUE button 374 also increments the door number (i.e., to Door 2). Alternatively, the user can touch the EXIT button 376 to update the mapping between the GPS coordinates received by the mobile computing device 350 and the prior room number, and close the application running on the mobile computing device 350.

In an alternative embodiment, the mobile computing device 350 instructs the user to capture an image of the room number on Door 1 and performs optical character recognition on the image to determine the room number on Door 1. In this embodiment, the screens 362 and 374 are replaced with a single screen with instructions for the user to capture an image of the room number on Door 1.

In some embodiments, the mobile computing device 350 is operable to transmit the associations between the GPS coordinates and the room numbers to the network service 210.

After one or more tape nodes have been installed in one or more rooms of the multi-unit building, the mobile computing application may instruct the user to install different types of tapes in different areas of the building. For example, in some embodiments, the mobile computing application instructs the user to adhere one or more master tape nodes (i.e., the black tape nodes) in the hallways between rooms of the building using a similar procedure as described in connection with the sequence of screens shown in FIG. 11. The black master tape nodes are configured to act as a wireless gateway between the peripheral white tape nodes and the network service 210 by communicating with the white tape nodes and the network service 210.

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Figure 12:
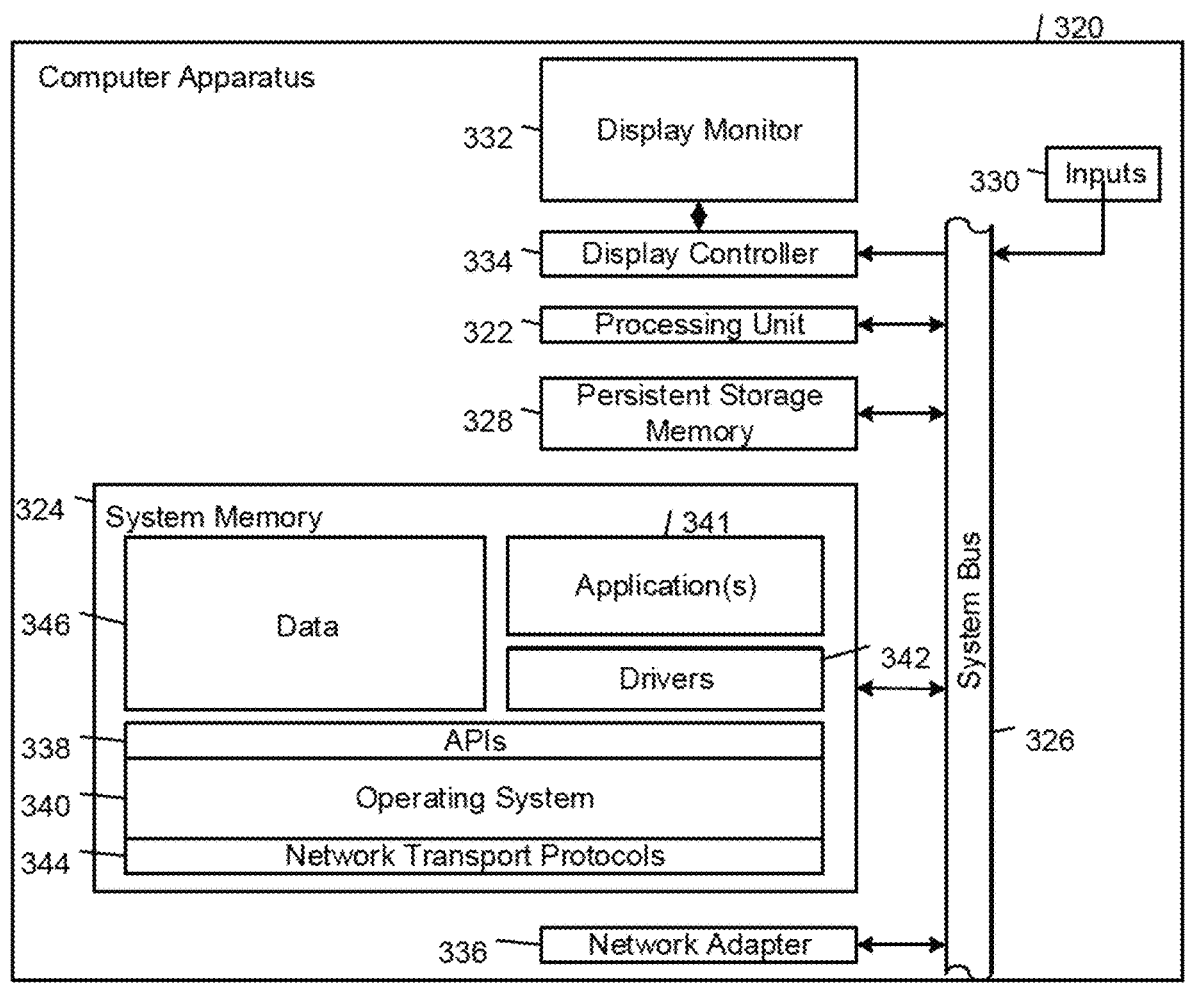
FIG. 12 is a block diagram of an example computer apparatus.

FIG. 12 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method of installing transient wireless network infrastructure enabling wireless communications in physical premises, comprising:

sending a wireless gateway device to the physical premises with a parcel, the wireless gateway device associated with the parcel, wherein the wireless gateway device comprises a first type of wireless communications interface, a second type of wireless communications interface, a processor coupled to the first type of wireless communications interface, and an energy source coupled to the processor, the first and second types of wireless communications interface, and a non-transitory processor-readable medium comprising processor-readable program code;

after the wireless gateway device is delivered to the physical premises, the processor of the wireless gateway device draws power from the energy source to perform operations comprising executing program code stored in the non-transitory processor-readable medium to establish a wireless communications connection with a network service through the first type of wireless communications interface;

based on execution of program code in the non-transitory processor-readable medium by the processor, the wireless gateway device performs operations comprising establishing wireless communications with one or more wireless peripheral devices in the physical premises through the second type of wireless communications interface, wherein each of the one or more wireless peripheral devices includes components comprising the second type of wireless communications interface, a processor coupled to the second type of wireless communications interface, and an energy source coupled to a processor, and a non-transitory processor-readable medium comprising processor-readable program code.

2. The method of claim 1, wherein the wireless gateway device comprises a locationing system operable to determine a current location of the wireless gateway device, and further comprising by the processor performing operations comprising initiating wireless communications through the first type of wireless communications interface based on a determination that the current location of the wireless gateway device corresponds to a location within the physical premises.

3. The method of claim 1, wherein removal an adhesive tape platform segment adhered to a respective parcel from the respective parcel renders the adhesive tape platform segment nonfunctional.

4. The method of claim 1, wherein the parcel comprises printed instructions to keep the wireless gateway device in the physical premises, the printed instructions displayed on one or more of a letter contained inside the parcel, a label adhered to the parcel, on the wireless gateway device, and on a surface of the parcel itself.

5. The method of claim 1, wherein the sending is performed by a parcel delivery service.

6. The method of claim 1, further comprising automatically sending a replacement wireless gateway device to the physical premises with a second parcel.

7. The method of claim 6, wherein the replacement wireless gateway device is sent automatically according to a predetermined schedule.

8. The method of claim 6, wherein the replacement wireless gateway device is sent automatically based on receipt of a communication from the wireless gateway device in the physical premises.

9. The method of claim 1, wherein the wireless gateway device further comprises a locationing circuit and, based on execution of program code in the non-transitory processor-readable medium by the processor of the wireless gateway device, receiving location coordinates from a satellite system through the locationing circuit.

10. The method of claim 9, further comprising, based on execution of program code in the non-transitory processor-readable medium by the processor of the wireless gateway device, configuring the first type of wireless communications interface to transmit, over the established wireless communications connection, information comprising a globally unique identifier of the gateway device and the received location coordinates.

11. The method of claim 1, wherein providing the messaging connectivity comprises, based on execution of program code in the non-transitory processor-readable media by the processor of the wireless gateway device, configuring the second type of wireless communications interfaces of the wireless gateway device and the wireless peripheral devices to establish wireless connections between the wireless peripheral devices and the wireless gateway device.

12. The method of claim 11, wherein the first type of wireless communications interface has a longer range than the second type of wireless communications interface.

13. The method of claim 12, wherein the first type of wireless communications interface is a cellular network interface.

14. The method of claim 12, wherein the first type of wireless communications interface is a Long Range Wide Area Network (LoRaWAN) interface.

15. The method of claim 1, wherein the wireless peripheral devices are physically associated with respective parcels.

16. The method of claim 15, wherein the wireless peripheral devices are shipped to the physical premises by third parties.

17. The method of claim 1, further comprising by one or more sensors in one or more of the wireless peripheral devices generating data characterizing an environmental state of the peripheral devices in response to exposure to external stimulus.

18. The method of claim 17, wherein the one or more sensors comprise one or more of a capacitive sensor, a pressure sensor, a humidity sensor, a light sensor, a sound sensor, an altimeter, a gyrator, an accelerometer, a temperature sensor, a flex sensor, and a strain sensor.

19. A system in physical premises, comprising:
  a battery powered wireless gateway device comprising a first type of wireless communications interface, a second type of wireless communications interface having a shorter range than the first type of wireless communication interface, a processor coupled to the first type of wireless communications interface, and an energy source coupled to the processor, the first and second types of wireless communications interface, and a non-transitory processor-readable medium comprising processor-readable program code;
  a plurality of battery powered wireless peripheral nodes each comprising the second type of wireless communications interface, wherein each of the plurality of wireless peripheral nodes is physically associated with a respective parcel;
  wherein, based on execution of program code in the non-transitory processor-readable medium by the processor, the battery powered wireless gateway device is operable to perform operations comprising establishing a wireless communications connection with a network service through the first type of wireless communications interface, and establishing wireless communications with one or more wireless peripheral devices in the physical premises through the second type of wireless communications interface, wherein the components of each wireless peripheral device are encapsulated within a respective segment of adhesive tape.

20. The system of claim 19, wherein the wireless gateway device is associated with a respective parcel.

* * * * *